Aug. 6, 1929. C. W. LARNER 1,723,359
VALVE
Original Filed May 2, 1919 2 Sheets-Sheet 2

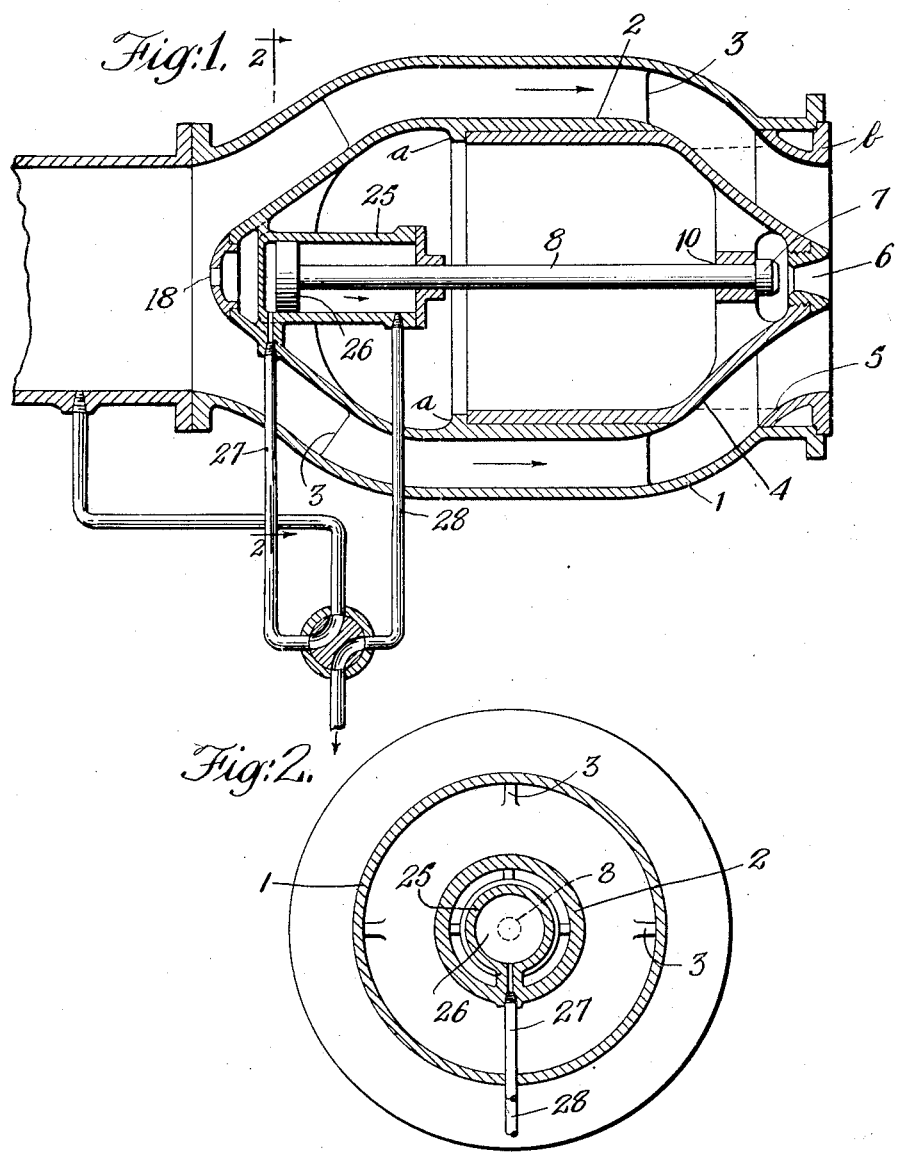

Inventor
Chester W. Larner
By his Attorneys
Edwards, Sager & Bowen

Patented Aug. 6, 1929.

1,723,359

UNITED STATES PATENT OFFICE.

CHESTER W. LARNER, OF PHILADELPHIA, PENNSYLVANIA, ASSIGNOR, BY MESNE ASSIGNMENTS, TO I. P. MORRIS CORPORATION, A CORPORATION OF DELAWARE.

VALVE.

Original application filed May 2, 1919, Serial No. 294,155. Divided and this application filed November 30, 1920, Serial No. 427,294. Renewed April 13, 1928.

This invention relates to valves for pipe lines or conduits and particularly to valves immersed in the fluid in the conduit and subjected to the pressure thereof. In such structures when the conduit is empty or the fluid in it still with no tendency to flow there is little resistance to the operation of the valve and at such times a comparatively light force is sufficient to open or close the valve. When the fluid in the conduit is flowing or stopped from flowing only by the valve, great pressures may be developed making it difficult to properly operate the valve.

One object of this invention is to provide an opening and closing means for such a valve which will be easily operated by hand or mechanical power when the conduit is empty or the fluid is without tendency to flow, and which will automatically utilize the fluid pressure in the conduit to move the valve as desired when the conditions of flow would otherwise render it difficult to operate the parts by hand or mechanical power. Another object is to provide a simple and durable construction. Still another object is to provide a valve which may be used for throttling the flow through the valve as in the case of outlets from dams or pressure conduits where the inlet end of the valve is under the full pressure of the reservoir or conduit and the outlet end is under reduced or atmospheric pressure, causing relatively high velocity of the water through the valve. Ordinary valves such as gate or slide valves are very difficult to open or close under such conditions, particularly if the pressures are high, and they are subject to serious vibration and erosion due to the fact that the water is discharged not in a smooth jet but in a violently disturbed condition. The valve herein described is of the needle type, discharging a smooth jet at all openings and the plunger may be held at any position or opening by the automatic balancing of the fluid pressure exerted upon the plunger without the application of any mechanical force whatever to the plunger. These objects and advantages will appear from the following description.

In the drawings, Figure 1, is a longitudinal cross section through a valve showing one form of my invention.

Fig. 2, is a transverse cross section on the line 2—2 of Fig. 1, looking toward the outlet end of the valve.

Figure 3:
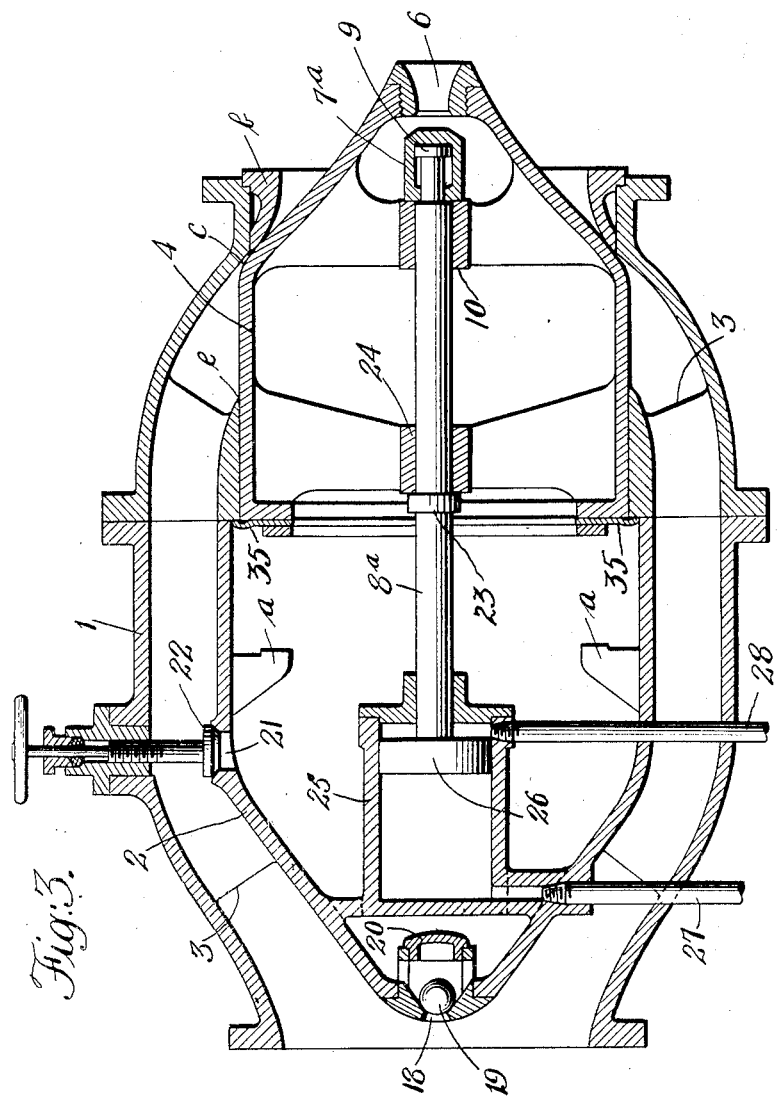
Fig. 3, is a view similar to Fig. 1, showing a modification in which the valve is adapted for use in cases of flow in both directions.

The valve casing includes an enlarged body 1, and has an internal cylinder 2, with a conical head at one end, the cylinder 2, being connected to body 1, by radial ribs 3. A moving element or plunger 4, slides in the internal cylinder 2, and its conical end closes against the seat 5, at the outlet end of the valve, as indicated in dotted lines, said seat being of less diameter than the outside of plunger 4, for the purpose which will appear from the following description.

Plunger 4, is provided with an aperture 6, which is controlled by valve 7, mounted on the end of rod 8, movable for a short distance without moving the plunger 4, as shown. The valve 7, for purposes of identification will be referred to as a choke valve. Rod 8, is guided at one end in a bearing 10, which is integral with plunger 4, being attached thereto by ribs, as shown. The movement of the valve plunger 4 is controlled by movement of the rod 8. With small valves hand power may be used to actuate this rod but in case of large valves with heavy plungers and also where remote control is desired it is preferable to use power means. In the specific embodiment shown a cylinder 25 is fixed within the internal cylinder 2 and has a piston 26 on rod 8 operated by exhausting pressure from one end of the cylinder and admitting line pressure to the other, for instance through pipes 27 and 28.

An aperture 18, is provided in internal cylinder 2, to admit line pressure inside of 2. This aperture is smaller than aperture 6, for reasons hereafter referred to.

The functions of this mechanism will be best understood by considering separately the several conditions under which such a valve may be required to operate. These conditions are as follows, "normal flow" being understood to be from left to right in the drawings, and "reverse flow" from right to left:

To open or close the valve:

(a) With the conduit under pressure and flow in the normal direction.

(b) With the conduit under pressure and flow in the reverse direction.

(c) With the line under pressure and no flow.

(d) With the line empty,

It being understood in cases (a) and (b) that the term "flow", with the valve closed, means simply tendency to flow, which results in motion of the fluid as soon as the valve is opened.

(a) With the valve closed under condition (a) valve 7, would be seated against aperture 6. The conduit beyond the plunger, being in this case cut off from the source of pressure supply, would be empty or in any event under lower pressure, usually atmosphere.

To open plunger 4, rod 8, is drawn backward by means of piston 26. This unseats valve 7, permitting pressure inside plunger 4, to escape to the region of lower pressure through aperture 6. Plunger 4, will then follow the motion of rod 8, as a result of the higher pressure on the nose of the plunger and the reaction of the flowing water on the curved surface of the nose. In this manner the plunger is opened at a rate which cannot exceed the movement of the hand gear by the operator because, if for any reason the plunger tends to travel faster, valve 7, will tend to re-seat itself on aperture 6, thus building up the pressure inside the plunger and checking its motion. Pressure is admitted at all times through aperture 18, but since this aperture is considerably smaller than 6, this constant admission of pressure does not interfere materially with the reduction of pressure through aperture 6. If the pressure on the nose of the plunger is not enough greater than the pressure inside the plunger to move the plunger hydraulically, rod 8, will move it mechanically by valve 7; striking against bearing 10.

When the plunger is open under condition (a), the operating mechanism will be in the position shown in Figure 1. The plunger will then be closed by moving rod 8, forward until valve 7, approaches aperture 6, when, if there is any considerable flow through the valve, pressure inside the plunger will build up sufficiently to move the plunger and if, due to low velocity of flow, this does not occur the plunger will be moved mechanically by valve 7, seating against plunger.

(b) Valve shown in Figure 1, will not operate if the flow is reversed.

(c) With no flow in the conduit the plunger will be opened mechanically by valve 7, striking against bearing 10, and closed mechanically by valve 7, striking against the inside of the end of the plunger.

(d) With the conduit empty the plunger will be opened and closed in the same manner as under condition (c).

It will be apparent from the foregoing description that, at no time, is the operating mechanism called upon to exert any more force than that required to seat or unseat valve 7 and if there is no flow to overcome the friction of plunger 4, in cylinder 2. The force exerted on plunger 4, due to any condition of unbalanced pressure can never be transmitted to the operating mechanism because under all conditions the motion of plunger 4, in relation to valve 7, will immediately counteract any tendency of plunger 4, to move faster than rod 8. For example, if plunger 4, is opened by opening valve 7, and tends to move faster than valve 7, this motion in itself will tend to reseat valve 7, thus automatically checking the motion of plunger 4. Conversely, if plunger 4, is closed by closing valve 7, and tends to move faster than valve 7, this motion of plunger 4, will immediately unseat valve 7, thus tending to check the motion of plunger 4. Valve 7, is so designed that it will open sufficiently to secure the maximum possible flow through aperture 6, before it strikes against the bearing 10.

The automatic function of valve 7 is to balance the fluid forces inside and outside of plunger 4 and thus keep the plunger 4 in a state of equilibrium. It is this automatic function which makes plunger 4 follow valve 7 and which holds plunger 4 stationary in any partly open position if valve 7 is held stationary. No matter what motion is imparted to valve 7 plunger 4 will inevitably follow until it reaches a position where the opposing fluid forces are again in equilibrium and there it will stop and remain until further motion is imparted to valve 7. When there is flow in the conduit, valve 7 never actually touches either bearing 10 or aperture 6 except when plunger 4 is in open and closed positions respectively. The coordinated motion of plunger 4 and valve 7 does not occur when there is no flow in the conduit as, for example, in the case where the conduit is closed beyond the outlet from the valve, because this coordinated motion depends upon having, around the extremity of aperture 6, a region of pressure relatively lower than the pressure of the fluid way which is communicated to the internal chamber through port 18 or through the clearance space around plunger 4. This region of lower pressure depends upon the velocity and direction of flow across the nose of plunger 4 and surrounding aperture 6, the action of the flow surrounding aperture 6 upon the flow through aperture 6 being similar to that of an ejector and tending to draw down the pressure in the internal chamber. It is obvious, therefore, that the shape of the plunger nose is vitally important in its effect upon the efficiency of aperture 6. If, for example, the nose of the plunger were made flat or blunt instead of conical so that the fluid, instead of being deflected by the pointed nose and turned into an axial direction, were allowed to flow across the plunger nose, so that the streams from opposite sides of the valve impinged upon each other, a back-pressure would be built up on aperture 6 which would prevent the reduction of pressure in the internal chamber which would otherwise result when aperture 6 is opened by valve 7. In this case plunger 4 could be unseated, but the balance of the stroke would have to be accomplished by mechanical force because there would be no region of lower pressure into which aperture 6 would discharge. The maximum efficiency of aperture 6 is obtained by prolonging the nose of the plunger until it extends as far as the point of maximum contraction of the flowing stream as it leaves the outlet end of the valve. This point can readily be determined if the valve is permitted to discharge into the atmosphere. It is also important to observe that the pointed plunger nose, necessary to the proper functioning of the valve 7, and aperture 6, is also most favorable in other important respects. It increases the dynamic reaction against the plunger and assists the opening of the plunger, reduces the hydraulic losses in the valve and produces a smooth discharging jet when the valve is used as a regulating nozzle on the end of a pipe line.

Figure 3, shows a longitudinal cross section through a valve with certain modifications intended to provide for operation with the flow reversed.

Valve 7$^a$, instead of being integral with rod 8$^a$, is separate and movable on rod 8$^a$, the motion provided being sufficient to permit valve 7$^a$, to seat on aperture 6, with rod 8$^a$, in the position shown on the drawing.

Plunger 4, is provided with a flexible annular packing disc 35, which seats against a shoulder in internal cylinder 2, when the plunger is closed thus preventing leakage from the inside of the internal cylinder to the water way in the valve body when the flow is lefthanded in the drawings. Aperture 18, is provided with a ball check 19, in a cage 20, to prevent flow from the internal cylinder into the valve body.

An additional aperture 21, controlled by a valve disc 22, operated in the usual manner by means of a screw and hand wheel, is provided in order to exhaust pressure from inside of internal cylinder 2, to the valve body when desired. Aperture 21, is larger than aperture 6, for reasons hereafter referred to. In all other respects the construction is the same as shown in Figure 1, and for flow righthanded in the drawings the operation is the same.

The conditions of operation are as follows, having reference to the four cases (a), (b), (c) and (d) previously enumerated:

(a) With the valve closed under condition (a) shoulder 23, on rod 8$^a$, abuts against bearing 24, in plunger 4, and valve 7$^a$, is seated on aperture 6, due to higher pressure inside of plunger 4, which is connected thereto through aperture 18, ball check 19, being open.

In order to open plunger 4, rod 8$^a$, is moved back until valve 7$^a$, is pulled open by collar 9, on rod 8$^a$, pressure inside plunger 4, is then discharged through aperture 6, in spite of the fact that it is at the same time entering through aperture 18, on account of the fact that aperture 6, is considerably larger than aperture 18. In this manner plunger 4, follows rod 8$^a$, until it is open when it is locked in that position by collar 9, holding valve 7$^a$, against bearing 10.

To close plunger 4, under condition (a), rod 8$^a$, is moved forward permitting valve 7$^a$, to approach its seat on aperture 6, thus confining inside of plunger 4, the line pressure which is admitted through aperture 18. The plunger moves forward due to the fact that the pressure inside the plunger is greater than that on its nose. Valve 7$^a$, moves forward on rod 8$^a$, until it strikes collar 9, due to the same unbalanced condition that moves plunger 4.

(b) Under condition (b) when plunger 4, is closed, the operating mechanism will be in the position shown by Fig. 3. Valve 7$^a$, will be back against collar 9, admitting pressure through aperture 6, inside of plunger 4, and this pressure will be confined due to ball check 19, closing aperture 18, and packing 35, seated against the shoulder in internal cylinder 2. The plunger is held closed due to the fact that the area inside of internal cylinder 2, exposed to pressure, is greater than the area of the seat.

In order to open plunger 4, valve 22, is opened discharging pressure from inside of internal cylinder 2. This will drop the pressure inside of plunger 4, in spite of the fact that it is entering through aperture 6, because aperture 21, is considerably larger than aperture 6. The rate at which plunger 4, opens may be controlled by the opening of valve 22, and the opening of plunger 4, is thus accomplished without recourse to the piston mechanism unless the velocity through the valve is so slow that the pressure exerted on the nose is not sufficient to open the plunger in which case the opening stroke may be assisted by the piston.

In order to close the plunger under condition (b) valve 22, must be closed and if there is any appreciable velocity of flow through the valve, plunger 4, will close itself as fast as rod 8$^a$, is allowed to move forward upon discharge or release of fluid pressure from the right or opening end of cylinder 25, this automatic closure upon reverse flow and release of pressure being due to the impingement of the reverse flow on aperture 6, thus causing higher pressure inside the plunger than outside. It will of course be understood that during normal flow through the conduit the valve 22 is closed so that in case of reverse flow fluid may flow into the plunger chamber through orifice 6 and be confined in the chamber thus automatically building up pressure in the plunger chamber to effect a closing force on the plunger.

(c) and (d) Under conditions (c) and (d) the plunger must be operated mechanically. It is opened by collar 9, striking against valve 7ª, and the latter against bearing 10, and is closed by shoulder 23, striking against bearing 24.

While those skilled in the art will understand the matter, it may be remarked that in the operation of the valve when there is sufficient flow from left to right in the drawings, the opening 18, is exposed to pressure that may be compared to the pressure head plus the velocity head and the opening 6, is exposed to pressure that may be compared to the pressure head minus the velocity head and by choking the opening 6, more or less with the valve 7, or 7ª, this difference in pressure can be availed of to move the plunger element. To close the plunger element the opening 6, is choked or closed and pressure allowed to build up inside the plunger valve. To open the plunger element the choke valve is opened releasing pressure inside the plunger element which opens under pressure on the outside of its nose, acting at first on an annular area c, and as the plunger opens on the entire nose.

a, are stops between which and the seat the plunger element moves with a regulated movement. Referring to Fig. 1, the contracted portion b, of the casing consists of a detachable ring provided with a flange corresponding to a flange on the reduced end of the casing, and it can be removed for the insertion of the plunger element so that the casing can be made circumferentially in one piece. The opening 18, may be omitted and pressure supplied inside the fixed element by leakage at e, through the clearance space.

It is to be noted that there is a chamber A having a movable wall consisting of the nose of the plunger, and a chamber B having a movable wall consisting of the piston 26, and it will be seen that when pressure is exhausted from chamber B pressure is supplied to chamber A thru orifice 18 and the valve will move toward closed position. When pressure is supplied to chamber B the valve 7 is opened and pressure is lessened in chamber A, and the valve will move toward open position. Therefore this construction forms in effect a differential piston, or a valve having differential pressure chambers alternately to and from which pressure is supplied and exhausted.

By the apparatus of this invention the auxiliary moving forces applied by the conduit pressures and the rate of movement of the valve are always under complete control and the position of the operating means indicates the position of the valve. In the construction shown there is no spill or discharge of fluid outside of the main and this is particularly advantageous in handling fluids which it is undesirable to waste or discharge.

This application is a division of my copending application Serial Number 294,155, filed May 2, 1919 for valve, now Patent No. 1,465,916, patented August 21, 1923.

I claim:

1. The combination with a conduit, of a flow controlling means therein comprising relatively movable cylindrical members each of which members has an opening from its interior communicating with the flow through said conduit, and means for controlling one of said openings comprising a fluid pressure operated piston in the space enclosed by said members.

2. The combination with a conduit of a flow controlling means therein comprising relatively movable cylindrical members each of which members has an opening from its interior communicating with the flow through said conduit, one of said openings being provided with an automatic fluid controlled valve and a movable control valve for the other of said openings operable by fluid pressure means to open or close one of said members across said flow.

3. The combination with a conduit having walls expanding in the direction of flow, of a cylinder in the expanded portion of said conduit having a conical end spreading the flow into an annular space between the cylinder and the conduit, smoothly contracting walls in the lower portion of said conduit, a hollow valve member in said cylinder closing against a seat in the contracted portion of said conduit, said valve member being of gradually tapering form in relation to said contracted walls and adapted to smoothly divert the flow of fluid in said conduit from a substantially axial direction in that portion of said conduit anterior to the region of closure to a direction oblique to the axis of said conduit at the region of closure and again to an axial direction in the portion of said conduit beyond the region of closure without sudden variation in direction or velocity and to develop a reaction against said tapering surfaces tending to move said valve, and means for moving said valve with relation to said contracting walls comprising fluid pressure operated means in said cylinder connected to said valve and operated by fluid pressure from said conduit, and a valve controlled fluid pressure connection from a portion of said conduit adapted to vary the fluid pressure against the inside of said valve so as to cooperate with said fluid pressure operated means to open or close said valve and balance the inner and outer pressures according to the conditions of flow in said conduit.

4. The combination with a conduit having walls expanding in the direction of flow, of a cylinder in the expanded portion of said conduit having a conical end spreading the flow into an annular space between the cylinder and the conduit, smoothly contracting walls in the lower portion of said conduit, a hollow valve member in said cylinder closing against a seat in the contracted portion of said conduit, said valve member being of gradually tapering form in relation to said contracted walls and adapted to smoothly divert the flow of fluid in said conduit from a substantially axial direction in that portion of said conduit anterior to the region of closure to a direction oblique to the axis of said conduit at the region of closure and again to an axial direction in the portion of said conduit beyond the region of closure without sudden variation in direction or velocity and to develop a reaction against said tapering surfaces tending to move said valve, and means for moving said valve with relation to said contracting walls to give a variable closure between them comprising fluid pressure operated means in said cylinder connected to said valve and operated by fluid pressure from said conduit, and a valve controlled fluid pressure connection from a portion of said conduit on the discharge side of said closure and adapted to vary the fluid pressure against the inside of said valve so as to co-operate with said fluid pressure operated means to open or close said valve.

5. The combination with a conduit having walls expanding in the direction of flow, of a cylinder in the expanded portion of said conduit having a conical end spreading the flow into an annular space between the cylinder and the conduit, smoothly contracting walls in the lower portion of said conduit, a hollow valve member in said cylinder closing against a seat in the contracted portion of said conduit, said valve member being of gradually tapering form in relation to said contracted walls and adapted to smoothly divert the flow of fluid in said conduit from a substantially axial direction in that portion of said conduit anterior to the region of closure to a direction oblique to the axis of said conduit at the region of closure and again to an axial direction in the portion of said conduit beyond the region of closure without sudden variation in direction or velocity and to develop a reaction against said tapering surfaces tending to move said valve, and means for moving said valve with relation to said contracting walls comprising a fluid pressure operated means in said cylinder connected to said valve and operated by fluid pressure from said conduit, and a valve controlled orifice interposed across the stream lines and communicating with the interior of said valve to vary the pressure therein.

6. The combination with a conduit having walls expanding in the direction of flow, of a cylinder in the expanded portion of said conduit having a conical end spreading the flow into an annular space between the cylinder and the conduit, smoothly contracting walls in the lower portion of said conduit, a hollow valve member in said cylinder closing against a seat in the contracted portion of said conduit, said valve member being of gradually tapering form in relation to said contracted walls and adapted to smoothly divert the flow of fluid in said conduit from a substantially axial direction in that portion of said conduit anterior to the region of closure to a direction oblique to the axis of said conduit at the region of closure and again to an axial direction in the portion of said conduit beyond the region of closure without sudden variation in direction or velocity and to develop a reaction against said tapering surfaces tending to move said valve, fluid pressure operated means in said cylinder connected to said valve to move it comprising power transmitting connections to said valve from said conduit, and means for controlling the pressure in the inside of said valve comprising means connecting the interior of said valve to a point of relatively high pressure in said conduit during closing and to a point of relatively low pressure during opening of said valve.

7. The combination with a conduit having walls expanding in the direction of flow, of a cylinder in the expanded portion of said conduit having a conical end spreading the flow into an annular space between the cylinder and the conduit, smoothly contracting walls in the lower portion of said conduit, a hollow valve member in said cylinder closing against a seat in the contracted portion of said conduit, said valve member being of gradually tapering form in relation to said contracted walls and adapted to smoothly divert the flow of fluid in said conduit from a substantially axial direction in that portion of said conduit anterior to the region of closure to a direction oblique to the axis of said conduit at the region of closure and again to an axial direction in the portion of said conduit beyond the region of closure without sudden variation in direction or velocity and to develop a reaction against said tapering surfaces tending to move said valve, fluid pressure operated means for moving said valve comprising power transmitting connections to said valve from said conduit, and means for controlling the pressure on said valve comprising a connection from the interior of said valve having an orifice opening into said conduit adjacent said contracted portion and positioned to utilize the variations in the flow velocity to vary the pressure within said valve.

8. The combination with a conduit having walls expanding in the direction of flow, of a cylinder in the expanded portion of said conduit having a conical end spreading the flow into an annular space between the cylinder and the conduit, smoothly contracting walls in the lower portion of said conduit, a hollow valve member in said cylinder closing against a seat in the contracted portion of said conduit, said valve member being of gradually tapering form in relation to said contracted walls and adapted to smoothly divert the flow of fluid in said conduit from a substantially axial direction in that portion of said conduit anterior to the region of closure to a direction oblique to the axis of said conduit at the region of closure and again to an axial direction in the portion of said conduit beyond the region of closure without sudden variation in direction or velocity and to develop a reaction against said tapering surfaces tending to move said valve, a connecting means between said conduit and the interior of said valve adapted to connect the interior of said valve to the conduit pressure during both opening and closing movements of the valve and vary the pressure in said valve, and fluid pressure operated means in said cylinder for moving said valve comprising an internal cylinder and piston connected to said valve to move it.

9. In combination with a conduit through which a fluid is adapted to be conducted, of a valve in the conduit comprising a casing having a seat, a hollow member within the casing having a plunger adapted to be moved to and from the seat to close and open the valve, pressure operated means to open and close the valve, and means for maintaining substantially the same pressure on the inner side of the plunger as exists on the outer side thereof when said plunger is stationary comprising connecting means between the interior of the valve and the fluid way, said connecting means being open to connect the interior of the valve to the fluid way during both opening and closing movements of the valve.

10. In combination with a conduit through which a fluid is adapted to be conveyed, of a valve in the conduit comprising a casing having a seat, an inner chamber with a movable part in the form of a plunger adapted to be shifted to and from the seat to close and open the valve, opening and closing chambers to which pressure is adapted to be supplied from said conduit and from which pressure is adapted to be exhausted to cause the opening and closure of the valve, and connecting means between the conduit and the interior of the valve, said connecting means being open during both the opening and closing movement of the valve and comprising valve control means by which the pressure on the outer end of the plunger is maintained on the inner side of the chamber.

11. In combination with a fluid conduit, a valve in the conduit comprising a casing, an inner hollow member having a movable part in the form of a plunger, fluid pressure means for shifting the plunger in one direction to open the valve and in the opposite direction to close the valve comprising an equalizing passageway communicating with the interior of the hollow member and with the water way for maintaining within the hollow member at any stationary position of the plunger substantially the same pressure that exists on the nose of the plunger, and means for opening and closing said passageway.

12. In combination, a fluid conduit, a valve seat therein, a hollow valve within said conduit, comprising two telescoping parts, one of which is fixed in the conduit and the movable section of which is formed with reverse curves and adapted to seat upon the valve seat, a connecting passage between the opposite sides of the movable section, an operating cylinder supported on the inside of the hollow valve on the fixed portion thereof, a piston in the operating cylinder mechanically connected to the movable element, means for alternately connecting opposite sides of the piston to the pressure of said fluid conduit, respectively, and means for closing the connecting passage.

13. In combination, a fluid conduit, a valve seat therein, a hollow valve within said conduit, comprising two telescoping parts, one of which is fixed in the conduit and the movable section of which is formed with reverse curves and adapted to seat upon the valve seat, a connecting passage between the opposite sides of the movable section, an operating cylinder supported on the inside of the hollow valve on the fixed portion thereof, a piston in the operating cylinder mechanically connected to the movable element, means for alternately connecting opposite sides of the piston to the pressure of said fluid conduit respectively, and means for closing the connecting passage during the closing movement of the movable section.

14. In combination, a fluid conduit, a valve seat therein, a hollow valve within said conduit, comprising two telescoping parts, one of which is fixed in the conduit and the movable section of which is formed with reverse curves and adapted to seat upon the valve seat, a portion of the downstream area of said movable section being always exposed to conduit pressure, a connecting passage between the opposite sides of the movable section, an operating cylinder supported on the inside of the hollow valve on the fixed portion thereof, a piston in the operating cylinder mechanically connected to the movable element, means for alternately connecting opposite sides of the piston to the pressure of said conduit respectively, and means for closing the connecting passage during the closing movement of the movable section.

15. In a pressure operated valve, a casing forming a fluid conduit, a hollow valve within the casing and composed of telescoping parts, one movable relative to the other, and differential pressure chambers within said parts in which different pressures are adapted to be established to operate the valve, one of said chambers being contained within the other, each of said chambers being supplied with operating pressure from said conduit.

16. In a pressure operated valve, a casing forming a fluid conduit, a hollow valve within the casing and composed of telescoping parts, one movable relative to the other, and differential pressure chambers within said parts in which different pressures are adapted to be established to operate the valve, one of said chambers being contained within the other, each of said chambers being supplied with operating pressure from said conduit and having a piston connected to the movable part of the valve.

17. In a pressure operated valve for a fluid way, a casing and a movable valve plunger forming between them an enclosed pressure chamber adapted to contain fluid under pressure different from that in the fluid way, a cylinder and piston within said pressure chamber and connected to said casing and said plunger to move the latter, means for admitting pressure from the fluid way to said pressure chamber, means for admitting pressure from the fluid way to said cylinder, and means for exhausting pressure from said cylinder to control the movement of the valve plunger.

18. In a pressure operated valve for a fluid way, a casing and a movable valve plunger forming between them an enclosed pressure chamber adapted to contain fluid under pressure different from that in the fluid way, a cylinder and piston within said pressure chamber and connected to said casing and said plunger to move the latter, means for admitting and exhausting pressure to and from said pressure chamber and connecting means between the cylinder and fluid way for admitting and exhausting pressure to and from said cylinder to control the movement of the valve plunger.

19. In a pressure operated valve for a fluid way, a casing and a movable valve plunger forming between them an enclosed pressure chamber adapted to contain fluid under pressure different from that in the fluid way, cooperating cylindrical surfaces on said casing and plunger slidably fitted together and of lengths equal to the length of stroke of the valve plunger, a cylinder and piston within said pressure chamber and connected to said casing and said plunger to move the latter, means for admitting and exhausting pressure to and from said pressure chamber and connecting means between the cylinder and fluid way for admitting and exhausting pressure to and from said cylinder to control the movement of the valve plunger.

20. In a valve of the plunger type, an outer casing, an inner valve member supported centrally therein, and composed of a stationary portion and a plunger slidingly engaging the same and movable during closure in the direction of normal flow through the valve, pressure operated means for moving the plunger to closed and open positions and including a plurality of chambers to and from which pressure is adapted to be supplied and exhausted, and means for obtaining pressure from substantially the center of the stream in the line to which the valve is adapted to be connected and applying this pressure to one of said chambers.

21. In a valve of the plunger type having an outer casing and an inner hollow casing spaced therefrom to form a substantially smooth annular fluid passageway, said outer casing having a contracted portion provided with a plunger seat, a plunger telescopically arranged with respect to the inner casing to form an internal chamber, means for operating said plunger including a piston and cylinder, and means whereby said internal chamber and one end of said cylinder are adapted to be subjected to the same fluid pressure while the other end of the cylinder is subjected to a different fluid pressure.

22. In a valve of the plunger type having an outer casing and an inner hollow casing spaced therefrom to form a substantially smooth annular fluid passageway, said outer casing having a contracted portion provided with a plunger seat, a plunger telescopically arranged with respect to the inner casing to form an internal chamber, means for operating said plunger, including a piston and cylinder disposed within the inner hollow casing, and means whereby said internal chamber and one end of said cylinder are adapted to be subjected to the same fluid pressure while the other end of the cylinder is adapted to be exhausted.

23. In a valve of the plunger type having an outer casing and an inner hollow casing spaced therefrom to form a substantially smooth annular fluid passageway, said outer casing having a contracted portion provided with a plunger seat, a plunger telescopically arranged with respect to the inner casing to form an internal chamber, means for operating said plunger including a piston and cylinder disposed within the inner hollow casing, and means whereby said internal chamber and one end of said cylinder are adapted to be subjected to the same fluid pressure during the closing stroke of the plunger.

24. In a valve of the plunger type, an outer casing, an inner valve member supported centrally therein, and composed of a stationary portion and a movable plunger for directly controlling the flow through the valve mechanism, said plunger having its outer portion slidingly engaging an outermost portion of said stationary part whereby the inner surface of said plunger is enclosed, pressure operated means for moving the plunger to closed and open positions and including a plurality of chambers to and from which pressure is adapted to be supplied and exhausted, and means for obtaining pressure from substantially the center of the stream in the line to which the valve is adapted to be connected and applying this pressure to one of said chambers.

25. In a valve, the combination comprising a conduit having an outer casing provided with a smooth tapering contraction, a conical valve plunger, a casing for supporting said plunger near the peripheral portion thereof to form a fluid pressure plunger chamber, said plunger being of the type adapted when the valve is closed and during tendency for flow conditions in the normal direction to substantially prevent communication between said plunger chamber and the downstream side of said conduit, said supporting casing and plunger forming a smooth fluid way with said tapering contraction and adapted to seat against the surface of said contraction to close said conduit, a piston and cylinder spaced from said plunger but operatively connected thereto, and means whereby, upon reverse flow and discharge of pressure in one end of said cylinder, said valve closes automatically.

26. In a valve, the combination comprising a conduit having a tapering contraction, a conical valve plunger and supporting means therefor forming a smooth fluid-way with said tapering contraction and adapted to seat against the surface of said contraction to close said conduit, an orifice in the nose of said plunger, and means, including a piston controlled check valve for said orifice, adapted upon reverse flow through said valve, to build up pressure automatically within said plunger to create a pressure force thereon in a closing direction.

27. In a valve, the combination comprising a conduit having an outer casing provided with a smooth tapering contraction, a conical valve plunger, a casing for supporting said plunger near the peripheral portion thereof to form a fluid pressure plunger chamber, said plunger being of the type adapted when the valve is closed and during tendency for flow conditions in the normal direction to substantially prevent communication between said plunger chamber and the downstream side of said conduit, said supporting casing and plunger forming a smooth fluid-way with said tapering contraction and said plunger being adapted to seat against the surface of said contraction to close said conduit, and means, including a piston and cylinder spaced from said plunger but operatively connected thereto, to move said plunger and to hold it at various open positions and to automatically close said valve upon reverse flow and discharge of pressure from one end of said cylinder.

28. In a valve, the combination comprising a conduit having an outer casing provided with a smooth tapering contraction, a conical valve plunger, a casing for supporting said plunger near the peripheral portion thereof to form a fluid pressure plunger chamber, said plunger being of the type adapted when the valve is closed and during tendency for flow conditions in the normal direction to substantially prevent communication between said plunger chamber and the downstream side of said conduit, said supporting casing and plunger forming a smooth fluid-way with said tapering contraction and said plunger being adapted to seat against the surface of said contraction to close said conduit, and operating means for said plunger including an opening chamber and a closing chamber, and means adapted automatically, upon reverse flow, to effect a closing pressure force in said closing chamber.

29. In a valve, the combination comprising a conduit having a tapering contraction, a conical valve plunger and supporting means therefor forming a smooth fluid-way with said tapering contraction and adapted to seat against the surface of said contraction to close said conduit, and operating means for said plunger including an opening chamber and a closing chamber within said plunger, and means including a valve controlled orifice in the nose of said plunger whereby upon reverse flow a closing pressure force is created directly and automatically in said closing chamber.

30. In a valve, the combination comprising a conduit having a tapering contraction, a conical valve plunger and supporting means therefor forming a smooth fluid-way with said tapering contraction and adapted to seat against the surface of said contraction to close said conduit, said supporting means forming an internal plunger chamber for closing, and means forming an opening fluid chamber, a check valve controlled passage between said plunger chamber and the normal upstream side of said plunger whereby, during normal flow, communication through said passage is permitted, and upon reverse flow, said normal upstream side is a region of low pressure and said communication is prevented.

31. In a valve, the combination comprising a conduit having a tapering contraction, a conical valve plunger and supporting means therefor forming a smooth fluid-way with said tapering contraction and adapted to seat against the surface of said contraction to close said conduit, means including piston and cylinder elements adapted to move said plunger toward its closing position during normal flow through said conduit, and means whereby said movement is automatically continued in case the flow through said valve should reverse.

CHESTER W. LARNER.